Figure 14:
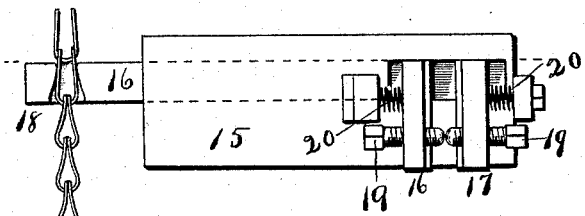

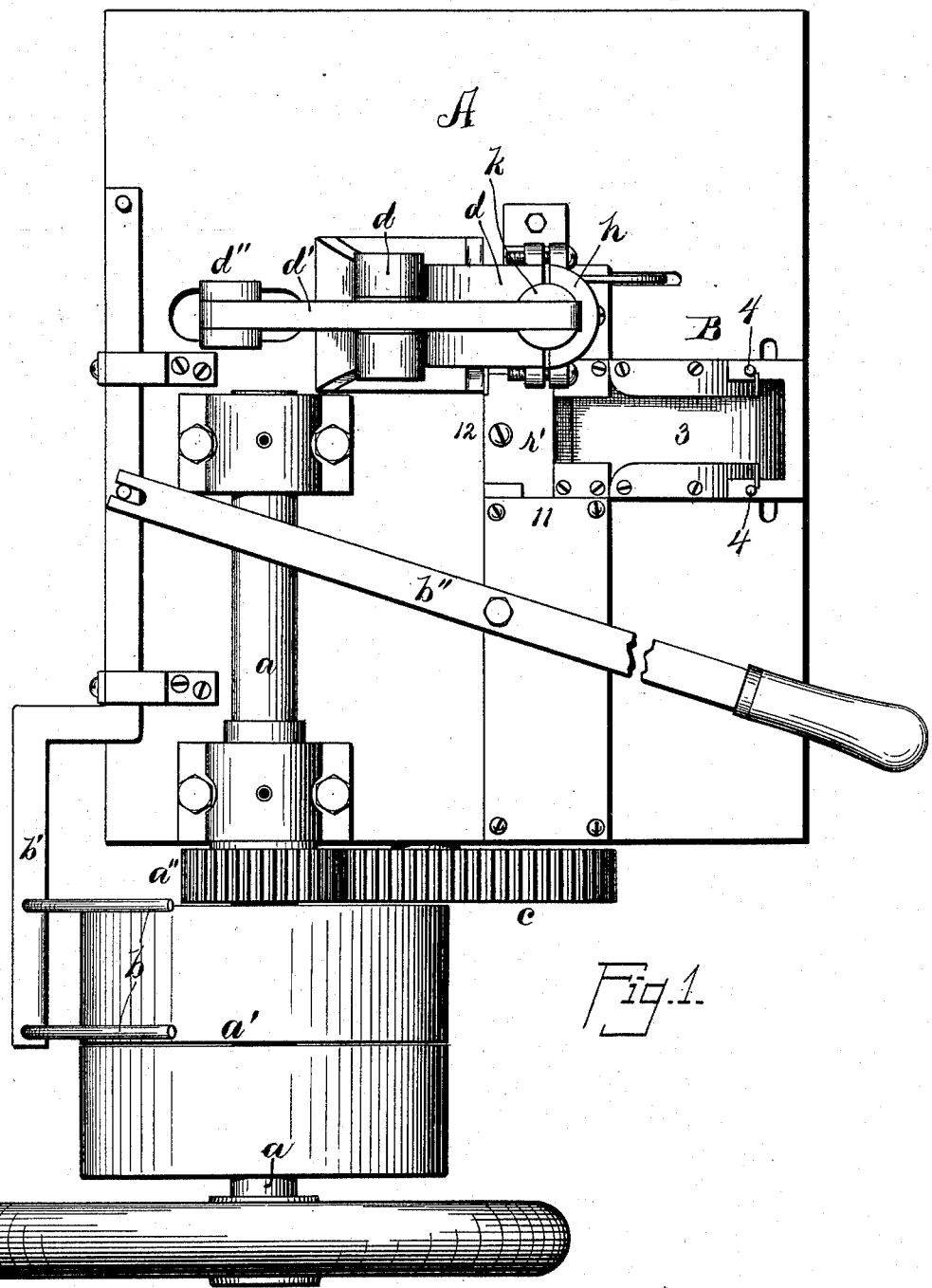

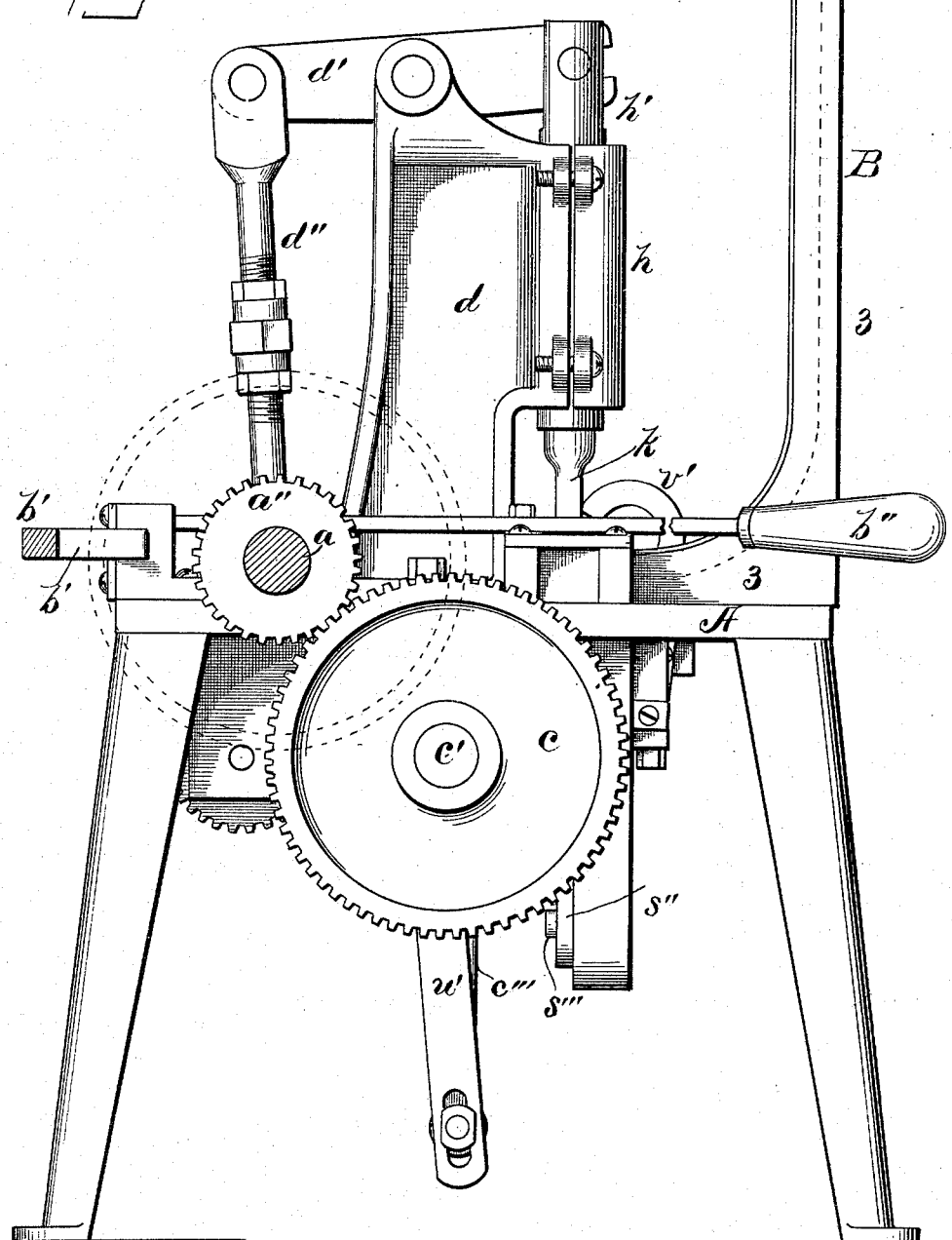

(No Model.) 5 Sheets—Sheet 3.
R. G. BARNES, H. D. POMEROY & E. W. KEYES.
CHAIN MAKING MACHINE.

No. 518,441. Patented Apr. 17, 1894.

WITNESSES:
H. A. Cashart,
D. May Goodrich.

INVENTORS
Ralph G. Barnes.
Harry D. Pomeroy.
Ernest W. Keyes.

By Smith & Denison
ATTORNEYS.

(No Model.) 5 Sheets—Sheet 4.
R. G. BARNES, H. D. POMEROY & E. W. KEYES.
CHAIN MAKING MACHINE.
No. 518,441. Patented Apr. 17, 1894.
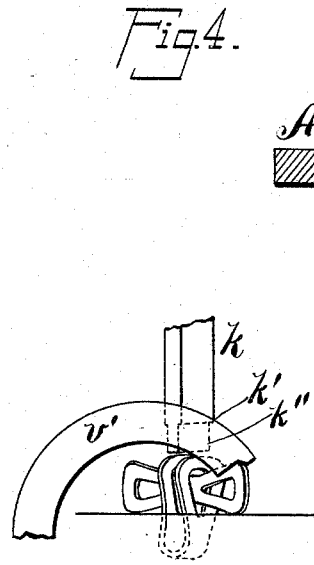
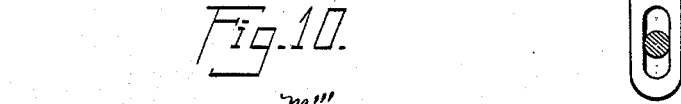
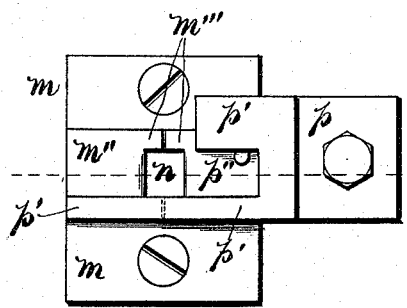
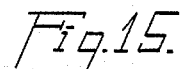
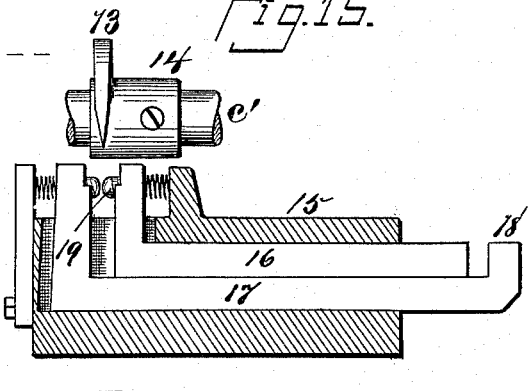
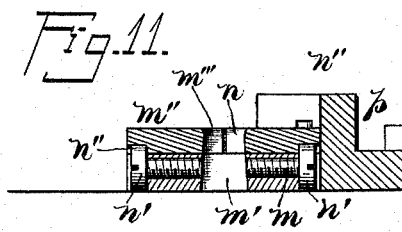
WITNESSES:
H. A. Carhart,
F. May Goodrich
Ralph G. Barnes,
Harry D. Pomeroy,
Ernest W. Keyes,
INVENTORS
By Smith & Denison
ATTORNEYS.
THE NATIONAL LITHOGRAPHING COMPANY,
WASHINGTON, D. C.

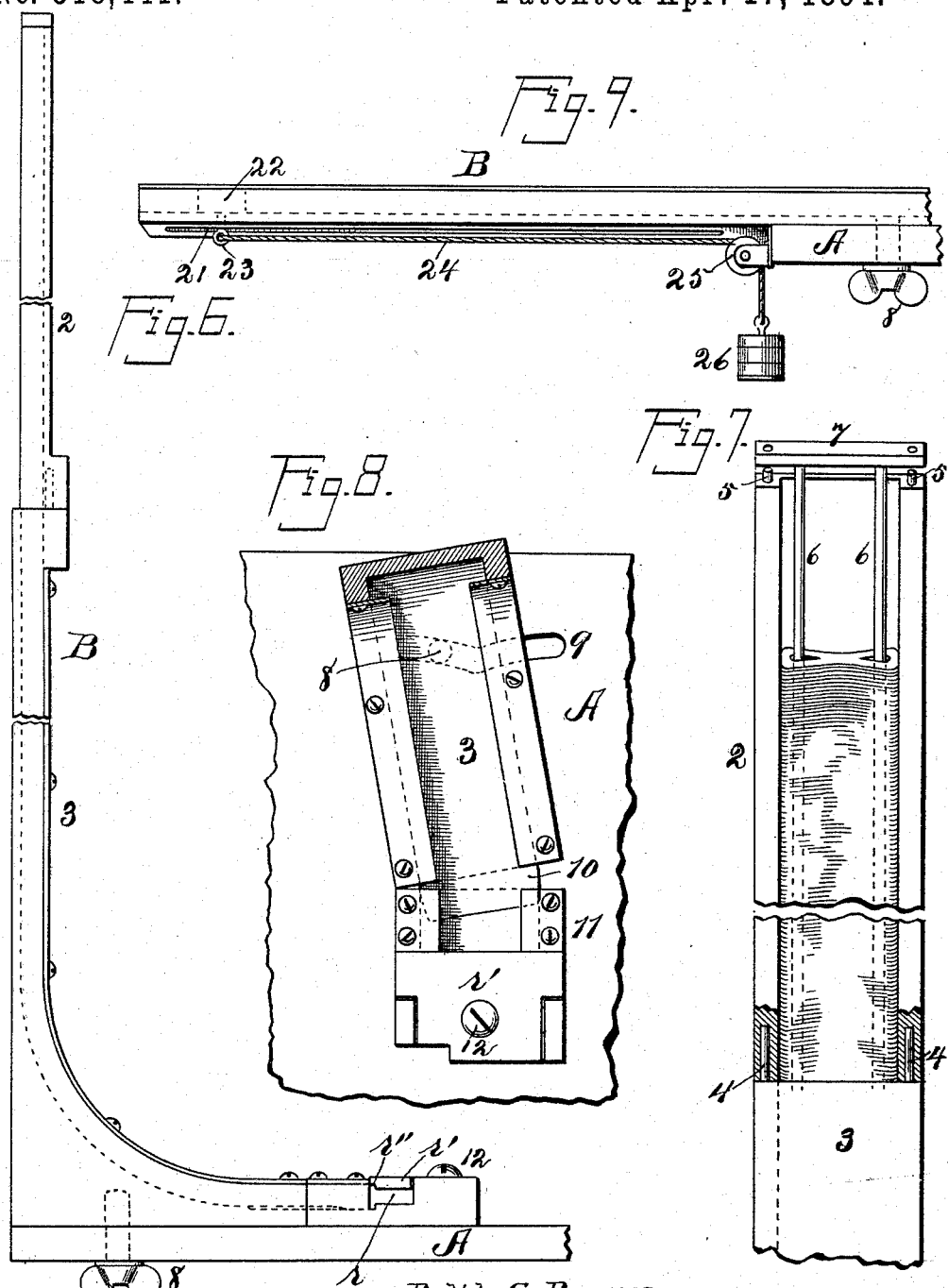

UNITED STATES PATENT OFFICE.

RALPH G. BARNES, OF SYRACUSE, AND HARRY D. POMEROY AND ERNEST W. KEYES, OF PHŒNIX, NEW YORK.

CHAIN-MAKING MACHINE.

SPECIFICATION forming part of Letters Patent No. 518,441, dated April 17, 1894.

Application filed August 7, 1893. Serial No. 482,611. (No model.)

*To all whom it may concern:*

Be it known that we, RALPH G. BARNES, of Syracuse, county of Onondaga, and HARRY D. POMEROY and ERNEST W. KEYES, of Phœnix, in the county of Oswego, in the State of New York, have invented new and useful Improvements in Chain-Making Machines, of which the following, taken in connection with the accompanying drawings, is a full, clear, and exact description.

Our invention relates to chain making machines, in which the chain is composed of sheet metal links stamped out, looped together and centrally bent, each successive link being passed through the eyes in the ends of the preceding link after it has been bent, and after being so passed through being, in its turn, bent centrally ready to receive another link.

Our object is to produce a machine for making a chain composed of flat links, perforated in their ends, each bent centrally, and receiving through its perforated ends, the plate to form the next link; in which the link plates are successively bent centrally to bring the perforated ends into alignment and more or less closely to parallelism, detained in that position until the next link plate is fed through the eyes of the preceding link, and then the latter link being bent centrally, the preceding link is forced a certain distance through the throat of the machine; in which each link plate is fed edgewise through the eyes of the bent or looped preceding link; in which, when so fed, it is turned flatwise, ready for the descent of the reciprocating plunger to bend or loop it centrally and force it down to bring its eyes into proper alignment to receive the next link plate as it is fed; all being performed and done automatically, so that our machine is, in reality, a machine for looping the link plates together to create a chain.

Our invention consists in the several novel features of construction and operation hereinafter described, and which are specifically set forth in the claims hereunto annexed. It is constructed as follows, reference being had to the accompanying drawings, in which—

Figure 3:
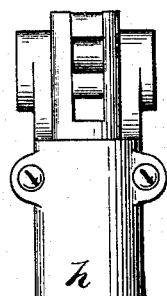
Figure 12:
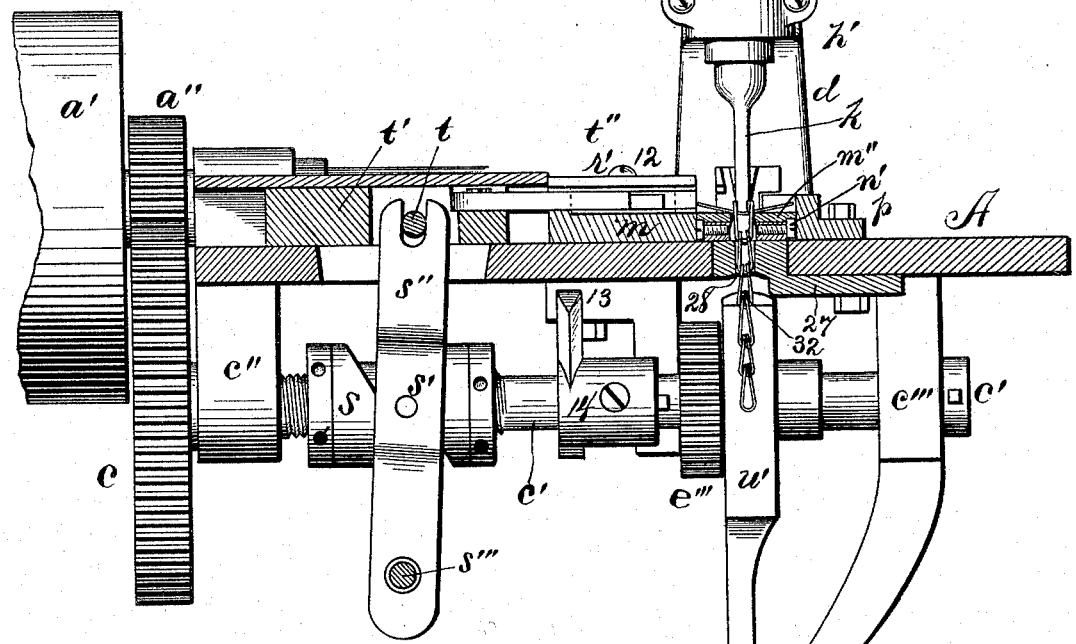
Figure 13:
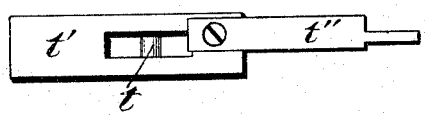

Figure 1, is a top plan of the machine. Fig. 2, is a side elevation thereof, omitting the driving pulleys, balance-wheel and the belt-shifting mechanism. Fig. 3, is a vertically sectional elevation of the same. Fig. 4, is a like view of the mechanism for turning a link-plate flatwise. Fig. 5, is an enlarged detail in plan-perspective showing a link-plate or blank, fed through the looped preceding link and standing on edge, and the turning arm about to engage therewith to turn it flat. Fig. 6, is a side elevation of the feed-chute, in which the link-blanks are placed. Fig. 7, is a rear sectional elevation of the upper part of the same, showing the manner in which the chute sections are connected, and also the mode of holding and guiding the link blanks therein. Fig. 8, is a top plan, partly in section of the feed chute showing the sections of the lower end thereof and the manner in which the main portion is oscillated upon the lesser stationary part. Fig. 9, is a side elevation of a horizontal feed-chute, and means to feed the link blanks by a weight. Fig. 10, is a top plan of the throat, through which the link-blanks are forced to bend or loop them centrally. Fig. 11, is a vertical longitudinal sectional elevation thereof on line $x\,x$, showing the means for adjusting the size of said throat. Fig. 12, is a top plan of the feed-bar, detached. Fig. 13, is a plan perspective of the plate covering the lower end of the feed chute. Fig. 14, is a front elevation of the link closing mechanism, for pinching the ends together. Fig. 15, is a top plan of the same.

A, is the bed, erected upon suitable legs or supports; $a$—, is the drive-shaft suitably journaled upon said bed; $a'$— is the drive pulley consisting of two sections, the one secured upon the shaft and the other loose thereon, and —$b$— is an ordinary belt shifter carried by the shifting bar —$b'$—, and —$b''$— is the shifting lever. The drive gear —$a''$— secured upon the drive shaft, meshes with the gear —$c$— secured upon the shaft —$c'$—, journaled in hangers —$c''$— and —$c'''$— beneath the bed. Upon the bed, the standard —$d$— is erected, in which the walking beam —$d'$— is journaled, and —$d''$— is a pitman connected thereto, its lower end (Fig. 4) being connected to the crank pin —$e$— upon the gear —$e'$—, driven by the pinion —$e''$—, meshing with it, and with the drive-gear —$e'''$— secured upon the shaft —$c'$—. Upon the front of the standard —$d$— a sleeve bearing —$h$— is provided, receiving the reciprocating plunger —$h'$— which is actuated by the walking beam, and carries the looper —$k$— (Figs. 3 and 5) provided with the shoulders —$k'$— and point —$k''$— of substantially the form shown in the drawings. Upon the bed, a table —$m$— is erected, provided with a slotway —$m'$— and dovetailed across its top to receive the slides —$m''$— having the lateral arms —$m'''$—, creating the throat —$n$— between the slides and their arms, and —$n'$— are set screws in the table, having flanged heads which engage with shoulders —$n''$— upon the slides, by which the width of the throat is adjusted and regulated.

A guide-plate —$p$— is secured upon the table and is provided with arms —$p'$— which over-lap the top of the table and more or less inclose the ends of said throat, and their inner walls rise above the table, the space —$p''$— between said arms being of substantially the same width as the length of the throat and the width of either end of a completed link blank when it is fed edgewise onto said table across the throat, and said walls guide the blank as it is turned flatwise, as hereinafter described.

B, is a feed-chute erected upon the bed, comprising a front, back and sides, connected so as to create a partly vertical and partly curved chute, the latter presenting the link blank on edge in the vertical passage —$r$— (Fig. 6) under the top plate —$r'$— and in alignment with the throat aforesaid.

A grooved cam —$s$— is adjustably secured upon the shaft —$c'$— with which the pin —$s'$— of the oscillating lever —$s''$— engages, said lever being pivoted upon a cross bar —$s'''$— and having its upper end in engagement with a pin —$t$— (Figs. 3 and 12) across a slot-way in the slide —$t'$—; and —$t''$— is a feed-bar secured to said slide, the latter being reciprocated upon the bed by said lever, and the feed-bar reciprocating in the passage —$r$—, and each time pushing a link-blank out onto the table. The first link fed, after being turned flat, as hereinafter described, is bent or looped to a U form, substantially as shown in Fig. 5 by the descent of the looper —$k$— and the next link is fed through the eyes in the ends of the preceding link (Fig. 5) and stands on edge therein. It is then turned flatwise onto the table and across the throat, by the following mechanism (Figs. 4 and 5): Upon a shaft —$c'$— a cam —$u$— is secured, standing within the rectangular opening in the oscillating bar —$u'$—, the lower end of which is mounted upon the hanger —$c'''$—, substantially as shown. A pin —$v$— upon said bar engages with the rocking and pivotally mounted link-turner —$v'$— projecting up through a slot —$v''$— in the bed, and extending over the table and having its upper end notched substantially as shown, to engage with the link, and as the rotation of the cam oscillates the bar —$u'$—, the link-turner is rocked to throw its upper end down to turn the link. When a link has been so turned, the descent of the looper with its point between the sides of the preceding link, its point bends the succeeding link to U form, and at the same time the shoulders —$k'$— engage with the upward ends of the preceding link and force it down through the throat far enough to bring the eyes of the second link into alignment to receive the third link, and so on.

The feed chute consists, as to the upper part, of the sections —2—, —3—, the upper one being removably mounted upon pins —4—, and it is also open on top and upon one side, and may also be provided with pins —5— upon its upper end. As the links are stamped out by the punch and dies (not shown) they are received upon the wires —6— connected at one end by the cross bar —7—, and when one of these frames is full, another is inserted. Then a frame of links, so strung, is inverted, its then lower end placed in the feed chute, the cross-bar drops onto the upper end thereof, and the pins —4— fit into holes in said cross bar to hold it in place, and the links feed down therefrom into the chute.

Inasmuch as the sheet metal is liable to vary in thickness, so that some links will, when stamped out, be a little thicker at one end, than the other, and also because the variation in the hardness or other properties of the metal, or perhaps some defect in the punch or die, will raise more of a burr at one end of the link than at the other, and such inequalities in thickness will cause the links to feed crooked, or one end in advance of the other, we construct the lower end of the chute in sections, one being the section —3— mounted upon the set screw —8— which passes through the slot-way —9— in the bed; and also having a lip —10— projecting into the stationary chute section —11— and rounded more or less, so that it forms a pivot upon which the section —3— swings, so that if one end of the links in the chute becomes advanced beyond the other end so that they stand diagonally across the chute, the chute can be swung so that they are in proper alignment as they enter the stationary section —11—. Also to accommodate the same inequalities, the top-plate —$r'$— covering the passage —$r$— and forming the top of this section of the feed-chute is provided with a rabbet —$r''$—, which is a guide for the link, and said plate being pivoted upon the screw —12— and the hole through said plate being also somewhat larger than the body of the screw, this plate is adjustable either by hand or automatically, to overcome the inequalities in thickness of the ends of the links, or any irregularities of presentation of the successive links to said passage.

In Figs. 14 and 15, we show our mechanism for pinching or closing the link-arms, comprising a wedge —13— mounted upon a collar or sleeve —14— secured upon the shaft —$c'$—; a block —15— secured below the bed, and provided with a seat to receive the angular grip-bars —16— and —17—, the bar —17— having an angular jaw —18—, and the end of the bar —16— constituting the other jaw, and both jaws being beveled or under-cut either on straight or curved lines; said bars being adapted to be reciprocated in said seat by the passage of said wedge through between the points of the screws —19—, which brings said jaws together to grip the sides of the link and squeeze the ends together, and as said wedge leaves said points, the springs —20— throw the jaws apart.

In Fig. 9 we show the feed-chute erected horizontally upon the bed; having its bottom slotted longitudinally as at —21—, a block —22— in the chute, shown in dotted lines, a rod connected to the block having an eye —23—, a cord —24— connected to said eye, and passing over the pulley —25— and secured to the weight —26— by which the links in the chute are fed along; the body of the chute being adapted to be swung laterally upon the set-screw, as above described and for the reasons stated. In Fig. 3 we also show an adjustable lower throat piece —27— mounted under the bed, of angular form, fitting up into the bed and notched or mortised as at —28— to receive the bent link from the throat dies, and operating to keep the chain straight.

In Fig. 4, at —29— is a yielding link-guide, receiving the link under the shoulder —30— and guiding it directly and positively into and through the eyes of the preceding bent link, and consisting of a block mounted and adapted to slide in ways, or hung upon a pivot pin, and —31— is a spring plunger engaging with said guide to hold it in, or return it to its normal position. When the plunger—$k$— descends, it engages with the beveled face of the guide, and forces it out of the way, and releases the link to be turned and bent.

In Fig. 4 we show the chain pulling mechanism consisting of a pin —32— projecting from the upper corner of the frame —$u'$— and adapted to enter the bend of a link as seen in Fig. 3 and then when said frame is thrown downward it pulls the chain down the length of one bent link, and as this draw is always vertical the upper bent link is always kept straight and in proper position for receiving the next link. The rocking of the frame to the right withdraws said pin, and the cam raises it into proper elevation to enter the next link when the frame swings to the left.

What we claim as our invention, and desire to secure by Letters Patent, is—

1. In a chain-looping machine, the combination with the bed, of a sectional feed-chute, one section being stationary and the other adapted to be adjusted upon the arc of a circle.

2. In a chain looping machine, the combination with the bed, of a sectional feed-chute, one section being stationary and provided with a transverse passage, and a swinging cover, and the other section adapted to be adjusted laterally.

3. In a chain-looping machine, the combination with the bed, and the sectional feed-chute and means to adjust one section relative to the other, the stationary section being provided with a transverse passage and an adjustable cover thereto, of a plunger adapted to be reciprocated in said passage, and a table adapted to receive the link-blanks from the chute.

4. In a chain-looping machine, the combination with the bed, and the table thereon, provided with an adjustable throat, and means to feed the links onto the table upon their edges, of a shaft below the bed, a cam thereon, a frame reciprocated by the cam, and a curved link-turner rocked upon its pivot by said frame and engaging with the link.

5. In a chain-looping machine, the combination with the bed, and the table thereon, provided with an adjustable throat, and means to feed the links onto the table upon their edges, of a shaft below the bed, a cam thereon, a frame reciprocated by the cam, and a curved link-turner reciprocated upon its pivot by said frame and engaging with the link, and a vertically reciprocating plunger adapted to engage with the link after it has been turned flatwise onto the table.

6. In a chain looping machine, the combination of a rotating shaft, and a wedge secured thereto, projecting therefrom and rotated thereby, with reciprocating link-closing jaws, adjustable points thereon between which said wedge passes to close said jaws, and means to re-open them after its passage.

7. In a link-looping machine the combination with the bed, and the table thereon provided with an adjustable throat, of a vertically reciprocating plunger pointed to bend a link centrally in said throat and shouldered to engage with the preceding bent link and force it through said throat, a rotatable shaft, a wedge secured thereon, jaws adapted to be closed by said wedge to squeeze the link-arms together and means to open said jaws.

8. In a chain looping machine the combination with a reciprocating link-bending plunger, of a yielding link-guide with which the plunger engages.

9. In a chain looping machine the combination with a reciprocating link-bending plunger, and a rocking link-turner, of a yielding link-guide with which the plunger engages to release the link to be turned flatwise and bent.

In witness whereof we have hereunto set our hands this 20th day of June, 1893.

RALPH G. BARNES.
HARRY D. POMEROY.
ERNEST W. KEYES.

In presence of—
HERBERT A. CARHART,
HOWARD P. DENISON.